(12) United States Patent
Hu et al.

(10) Patent No.: US 9,088,901 B2
(45) Date of Patent: Jul. 21, 2015

(54) METHOD AND ARRANGEMENT IN A WIRELESS COMMUNICATION SYSTEM

(75) Inventors: Yang Hu, Beijing (CN); Jiansong Gan, Beijing (CN); Abdulrauf Hafeez, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 368 days.

(21) Appl. No.: 13/521,600

(22) PCT Filed: Feb. 11, 2010

(86) PCT No.: PCT/US2010/023857
§ 371 (c)(1),
(2), (4) Date: Oct. 12, 2012

(87) PCT Pub. No.: WO2011/099970
PCT Pub. Date: Aug. 18, 2011

(65) Prior Publication Data
US 2013/0194942 A1    Aug. 1, 2013

(51) Int. Cl.
*H04W 24/02* (2009.01)
*G01S 5/04* (2006.01)
*H04W 64/00* (2009.01)

(52) U.S. Cl.
CPC .............. *H04W 24/02* (2013.01); *G01S 5/04* (2013.01); *H04W 64/006* (2013.01)

(58) Field of Classification Search
CPC ........... H04J 3/14; H04L 43/50; H04L 43/00; H04B 17/00; H04W 24/00
USPC .......................................... 370/252, 241, 310
See application file for complete search history.

(56) References Cited

U.S. PATENT DOCUMENTS

| 6,031,490 A | 2/2000 | Forssen et al. |
| 6,191,736 B1 | 2/2001 | Yukitomo et al. |

(Continued)

FOREIGN PATENT DOCUMENTS

CN    1476262 A    2/2004

OTHER PUBLICATIONS

3rd Generation Partnership Project. "3rd Generation Partnership Project; Technical Specification Group Radio Access Network; Further Advancements for E-UTRA Physical Layer Aspects (Release 9)." 3GPP TR 36.814, V0.4.1, Feb. 2009, Sophia Antipolis Valbonne, France, pp. 1-31.

(Continued)

*Primary Examiner* — Andrew Lai
*Assistant Examiner* — Zhiren Qin
(74) *Attorney, Agent, or Firm* — Coats & Bennett, P.L.L.C.

(57) ABSTRACT

Method and arrangement in a first base station for calculating a first location parameter α of a user equipment in order to improve beamforming accuracy. The first base station and the user equipment are comprised in a Coordinated Multiple Point "CoMP" communication system together with a second base station. The method comprises measuring a signal received from the user equipment, estimating a first parameter value α' based on the measured signal, obtaining a second parameter value α", based on an estimated second location parameter β of the user equipment, estimated at the second base station and calculating the first location parameter α, based on the first estimated parameter value α' and the obtained second parameter value α".

16 Claims, 6 Drawing Sheets

(56) References Cited

U.S. PATENT DOCUMENTS

| | | |
|---|---|---|
| 2002/0151301 A1 | 10/2002 | Miyoshi |
| 2005/0270228 A1 | 12/2005 | Stephens |
| 2010/0062793 A1* | 3/2010 | Sun et al. .................. 455/456.3 |
| 2010/0081451 A1* | 4/2010 | Mueck et al. .............. 455/456.1 |
| 2010/0167748 A1* | 7/2010 | Lim et al. ...................... 455/450 |
| 2011/0026473 A1 | 2/2011 | Luo et al. |

OTHER PUBLICATIONS

Li, F. et al. "Performance Analysis for DOA Estimation Algorithms: Unification, Simplification, and Observations." IEEE Transactions on Aerospace and Electronics Systems, vol. 29, No. 4, Oct. 1993, pp. 1170-1184.

* cited by examiner

METHOD AND ARRANGEMENT IN A WIRELESS COMMUNICATION SYSTEM

TECHNICAL FIELD

The present invention relates to a method and arrangement in a base station. In particular, it relates to a mechanism for calculating a first location parameter of a user equipment within a Coordinated Multiple Point (CoMP) system.

BACKGROUND

Coordinated multiple point (CoMP) is a key feature in the Long Term Evolution (LTE) advanced to further improve the coverage of high data rates, the cell-edge throughput and/or to increase system throughput, with the aim to meet 3rd Generation Partnership Project (3GPP) LTE advanced requirements on downlink. In the present context, the expression uplink denotes the communication from a user equipment (UE) to a base station, while the expression downlink denotes communication in the opposite direction, i.e., from the base station to the user equipment. Downlink CoMP transmission refers to a system where the transmission at multiple, geographically separated antenna sites is dynamically coordinated. The coordination can either be distributed, by means of direct communication between the different sites, or by means of a central coordinating node. Examples of coordinated transmission schemes include two main categories: Coordinated scheduling and/or beamforming and Joint processing/ transmission.

Coordinated Scheduling and/or Beamforming

It is characterized by that data to a single user equipment is simultaneously transmitted from multiple transmission points, e.g., to, coherently or non-coherently, improve the received signal quality and/or cancel actively interference for other user equipments, which puts higher requirements on the coordination links and the backhaul since the user data need to be made available at the multiple coordinated transmission points.

Coordinated scheduling: This is a most straight-forward approach of CoMP, meaning that user equipments are scheduled to be served by their attached cells in a manner such that the mutual interference among them within the cooperating set is minimized. This can to some extent be seen as an extension of the Inter-Cell Interference Coordination (ICIC) functionality present already in LTE Rel-8. Since it is a scheduling based solution, the physical layer transmission and reception of user data remain unchanged.

Coordinated beamforming: When the transmission points in the cooperating set are equipped with antenna arrays, a multi-antenna user equipment may receive multiple data streams, where the streams may be transmitted from multiple transmission points or a single transmission point in the cooperating set. In addition, Grid-of-Beams (GOB) based Space-Division Multiple Access (SDMA) and/or Multiuser beamforming received considerable attentions. Coordinated beamforming requires estimates of transmit channel correlation matrices for antenna arrays at all transmission points in the cooperating set, which can be obtained by means of uplink Sounding Reference Signals (SRS).

Joint Processing/Transmission

Coordinated transmission schemes comprising joint processing/transmission is characterized by that data to a single user equipment is simultaneously transmitted from multiple transmission points, e.g., to coherently or non-coherently improve the received signal quality and/or cancel actively interference for other user equipments, which puts higher requirements on the coordination links and the backhaul since the user data need to be made available at the multiple coordinated transmission points.

Joint processing/transmission is according to some embodiments carried out from several transmission points and pre-coded in a coherent fashion. In Time Division Duplex (TDD) systems, channel reciprocity between uplink and downlink can in principle be used to acquire this CSI at the network side, based on transmission of uplink SRS. Meanwhile, the differences due to the analogue receive/transmit chains need to be worked out. In Frequency Division Duplex (FDD) systems, the CSI about the downlink channels must be explicitly fed back from each user equipment to its coordination centre. The bit rate needed to support this feedback on the uplink increases significantly with some factors, e.g., user equipment's speed and frequency-domain channel selectivity, which is a very challenging problem.

Implementation of Downlink CoMP

For different categories mentioned above, different design is considered. In the case of coordinated scheduling, the actual downlink transmission can be carried out exactly as for LTE Rel-8 implying no specific impact to the radio-interface specification. In the case of coordinated beamforming with multi-stream downlink transmissions, multiple user equipment-specific reference signals (DRS) is needed and standardized to support since coordinated beamforming employs adaptive beam weights which are not derived from a codebook and multiple DRS are used for channel demodulation.

In the case of joint transmission, two alternatives are possible: joint transmission can be seen as originating from a set of cell-specific antenna ports, which may be associated with different cells. This can be seen as a generalization of LTE Rel-8 code-book-based multi-antenna transmission to antenna ports of more than one cell. In this case, user equipment channel estimation would rely on the cell-specific reference signal associated with each of the antenna ports involved in the joint transmission. However, the user equipment would need to know how the transmission is carried out, i.e., the exact set of antenna ports that are involved in the joint transmission and what transmission weight is applied at each antenna port.

For non-codebook based beamforming, each site in a cooperating set will need channel information based on uplink SRS to generate beamforming vector. The beamforming accuracy is directly related to downlink CoMP performance. However, in a realistic downlink CoMP system, beamforming accuracy will face some challenges.

Different link quality from the user equipment to different site in a cooperating set. In a typical case, the user equipment location in a CoMP system depends on CoMP scheduling strategy and geometric structure, which possibly results in different distance between the user equipment and different site. Furthermore, uplink power control and uplink timing advance are adjusted only according to one of sites, e.g., the nearest site. Different uplink transmission quality will impact on beamforming accuracy.

Therefore, from user equipment point of view there are two kinds of site in a cooperating set in terms of different uplink transmission quality: the one which is relatively far away from the user equipment, which may be referred to as a "Weak" site and the one which is relatively near to the user equipment which may be referred to as a "Strong" site.

Based on the analysis above, downlink CoMP performance is to some extent impacted and limited by the weak sites, which possibly result in poor beamforming accuracy. So, to improve the beamforming accuracy in the weak sites can improve overall downlink CoMP performance, e.g., reduced interference in multi-user beamforming system and increased signal power in single-user beamforming system.

There are different strategies for non-codebook based beamforming in Frequency Division Duplex (FDD) and Time Division Duplex (TDD). In TDD, channel reciprocity can be exploited to benefit short-term beamforming by means of the method of channel matrix decomposition. Whereas for FDD, this would imply that the information is limited to path loss and long-term fading due to no channel reciprocity in separate bands. However, one general way for both FDD and TDD is to utilize spatial information, e.g., direction of arrival (DoA), regardless of whether or not channel reciprocity can be exploited.

It is thus a problem to determine the location of a user equipment in relation to a base station, e.g., by determine direction of arrival or distance with an improved accuracy.

SUMMARY

It is therefore an object of the present invention to obviate at least some of the above stated disadvantages and provide a mechanism for improving the performance in a wireless communication system.

According to a first aspect of the present invention, the object is achieved by a method in a base station. The method aims at calculating a first location parameter a of a user equipment in order to improve beamforming accuracy within a Coordinated Multiple Point (CoMP) communication system. The communication system comprises the first base station, the user equipment and a second base station. The method comprises measuring a signal received from the user equipment. Also, a first parameter value $\alpha'$ is estimated, based on the measured signal. Further, a second parameter value $\alpha''$, based on an estimated second location parameter $\beta$ of the user equipment, estimated at the second base station, is obtained. In addition, the first location parameter $\alpha$ is calculated, based on the first estimated parameter value $\alpha'$ and the obtained second parameter value $\alpha''$.

According to a second aspect of the present invention, the object is achieved by an arrangement in a base station for calculating a first location parameter $\alpha$ of a user equipment in order to improve beamforming accuracy within a Coordinated Multiple Point (CoMP) communication system. The communication system comprises the first base station, the user equipment and a second base station. The arrangement comprises a measurement unit. The measurement unit is configured to perform measurements on a signal received from the user equipment. Also, the arrangement comprises an estimating unit. The estimating unit is configured to estimate a first parameter value $\alpha'$, based on the measured signal. Further, in addition, the arrangement comprises an obtaining unit. The obtaining unit is configured to obtain a second parameter value $\alpha''$, based on an estimated second location parameter $\beta$ of the user equipment, estimated at the second base station. Additionally, the arrangement furthermore comprises a calculating unit. The calculating unit is configured to calculate the first location parameter $\alpha$, based on the first estimated parameter value $\alpha'$ and the obtained second parameter value $\alpha''$.

Thanks to the present solution, by improving the estimation of the direction of arrival, it is possible to improve the beamforming accuracy within a Comp system. By using known geographical relations between stationary nodes within the Comp system, the present method is easily implanted and may, due to flexibility and low complexity be applicable both in FDD and TDD environment, thereby rendering a robust and reliable performance. The present method and arrangement further offers a flexible selection of physical measurements such as, e.g., received Signal-to-Noise Ratio (SNR), to base the categorization of base stations on. According to the present method and arrangement, the estimation of the direction of arrival may be further improved with more stationary nodes available, working in cooperation for helping each other achieving improved estimation of the direction of arrival, and thereby also improved beamforming accuracy. In addition, the present method and arrangement is applicable for improving DoD estimation accuracy for one or multiple sites in a cooperating set by using signals transmitted by multiple sites with known CoMP geometric structure. Thus the performance of the wireless communication system is improved.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and an arrangement in a base station, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1:
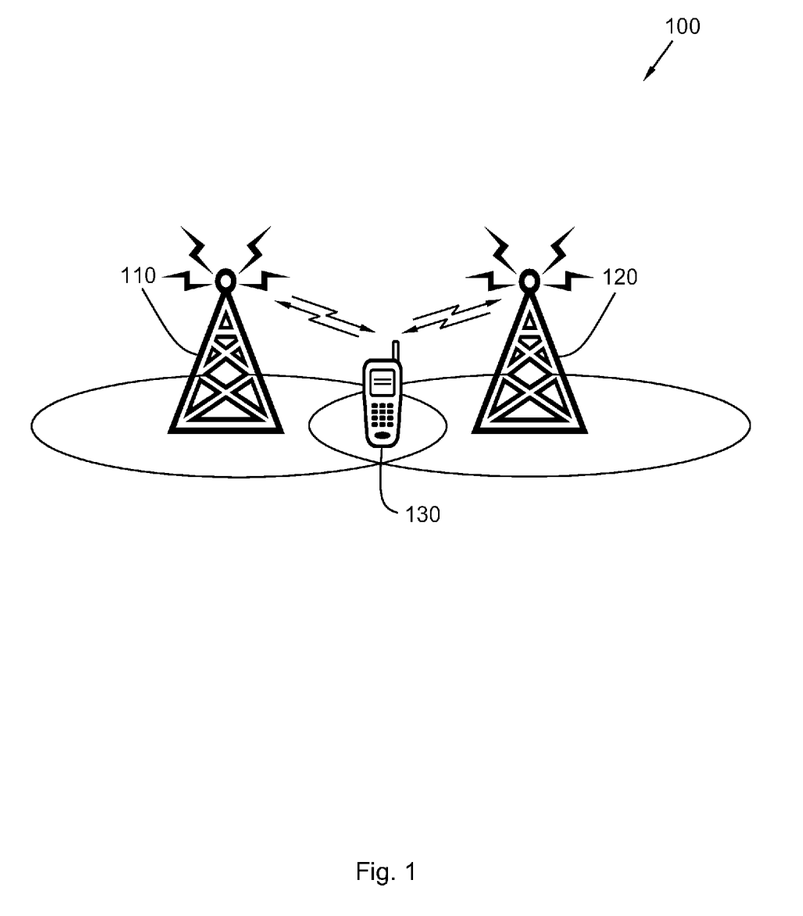
FIG. 1 is a schematic block diagram illustrating an exemplary communication system, in which the present method and arrangement may be applicable.

FIG. 1 depicts a Coordinated Multiple Point (COMP) communication system 100, based on technologies such as, e.g., LTE, LTE-Advanced, Universal Mobile Telecommunications System (UMTS), Evolved UMTS Terrestrial Radio Access Network (E-UTRAN), Global System for Mobile communications/Enhanced Data rate for GSM Evolution (GSM/EDGE), Wideband Code Division Multiple Access (WCDMA), a 3GPP WCDMA system, Worldwide Interoperability for Microwave Access (WiMax), or Ultra Mobile Broadband (UMB), just to mention some few arbitrary possible options.

The illustrated CoMP communication system 100 comprises a first base station 110, a second base station 120 and a user equipment 130. The user equipment 130 is configured to communicate wirelessly with the base station 110, 120.

The purpose of the illustration in FIG. 1 is to provide a general overview of the present methods and the functionalities involved.

In the following, the present methods and arrangements are further elaborated with specific reference to LTE systems such as, e.g., E-UTRAN. Thus, the CoMP communication system 100 is described and exemplified mainly as an E-UTRAN network throughout the rest of the description, for enhanced comprehension and readability. However, it is obvious to the skilled person that corresponding concepts could also be applied in other CoMP communication systems 100.

The base station 110, 120 may be referred to as, e.g., a NodeB, an evolved Node B (eNB, or eNode B), a base transceiver station, Access Point Base Station, base station router, or any other network unit capable to communicate with the user equipment 130 within the cell, depending, e.g., of the radio access technology and terminology used. In the rest of the description, the term "base station" will be used for the base station 110, 120 in order to facilitate the comprehension of the present methods and arrangements.

The user equipment 130 may be represented by, e.g., a wireless communication terminal, a mobile cellular phone, a Personal Digital Assistant (PDA), a wireless platform, a laptop, a computer or any other kind of device capable to communicate wirelessly with the base station 110, 120.

The base station 110, 120 controls the radio resource management within the respective cell. Also, the base station 110, 120 is responsible for ensuring reliable communication links between the base station 110, 120 and the user equipment 130, e.g., by means of outer Automatic Repeat reQuest (ARQ).

A basic concept of the present methods and arrangements is to improve the location of a user equipment 130, a user equipment location parameter and/or the direction of arrival (DoA) estimation accuracy for one or multiple sites in a cooperating set by using signals received by multiple sites with known CoMP geometric structure.

According to some embodiments, the direction of arrival accuracy of strong sites can improve each other within strong sites. According to some embodiments, the direction of arrival accuracy of weak sites can be improved by strong sites.

Concerning joint transmission, it may be at least briefly mentioned that joint transmission can be seen as originating from a user equipment 120 specific antenna port, such as, i.e., antenna port 5. The transmission may be carried out from the same set of physical antennas as for joint transmission based on cell-specific antenna ports, which implies that the user equipment 120 may not need to know what set of physical antennas are involved in the transmission nor exactly what antenna weight is applied at each such antenna. To extend current antenna-port 5 transmission to also support spatial multiplexing can obtain more benefits in CoMP systems 100, according to some embodiments.

Non-codebook based downlink beamforming can be well applied in CoMP systems 100 with the following advantages: combination of beamforming and spatial multiplexing. Multiple user specific reference signals (DRS) may be used. Inter-/infra-coordination-set interference avoidance and beams can be designed flexibly to reduce signal leakage toward user equipment 120 in neighboring/current cooperating set. Downlink beamforming based on antenna port 5 for joint transmission allows a more flexible coordination with less downlink signaling overhead and very limited impact on the radio-interface specification. Also, the set of physical antennas in the joint transmission and antenna weight applied at each antenna is not needed to known, which significantly simplifies the implementation of downlink CoMP.

Figure 2A:
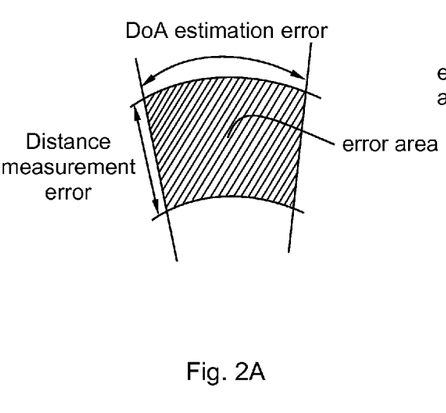
FIG. 2A is a schematic block diagram illustrating a two-dimensional estimation error area in the spatial domain.

FIG. 2A is a schematic block diagram illustrating a two-dimensional estimation error area in the spatial domain, associated with direction of arrival estimation and distance measurement.

The width and breadth of the error area correspond to the error in the angle and the distance, respectively. The size of error area is determined by received Signal-to-Noise-Ratio (SNR) at each site. In general, the higher the received SNR, the higher direction of arrival estimation accuracy and distance measurement accuracy, and hence the smaller error area.

So, usually in a CoMP system 100, weak sites have larger estimation error area due to lower received SNR while strong sites have smaller estimation error area due to higher received SNR. The relationship between error areas due to coordinated sites may thus improve direction of arrival estimation by reducing the uncertainty area for each site. For instance, with two areas associated with two sites, there are three cases, as illustrated in FIG. 2B, FIG. 2C and FIG. 2D, respectively.

Figure 2B:
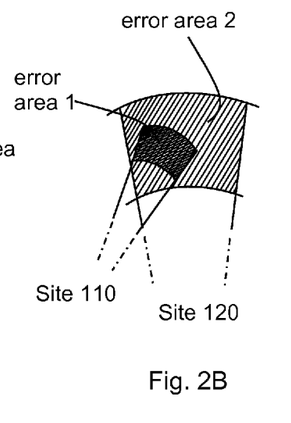
FIG. 2B is a schematic block diagram illustrating two fully overlapping two-dimensional estimation error areas in the spatial domain.

FIG. 2B illustrates the first case comprising two fully overlapping two-dimensional estimation error areas in the spatial domain.

If error area 1, which corresponds to site 110, falls fully within the region of error area 2, which corresponds to site 120, there is a better direction of arrival estimation for site 120 and vice versa.

Figure 2C:
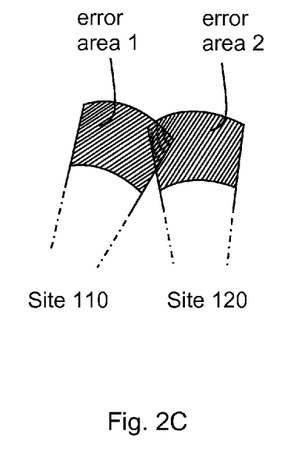
FIG. 2C is a schematic block diagram illustrating two partially overlapping two-dimensional estimation error areas in the spatial domain.
Figure 2D:
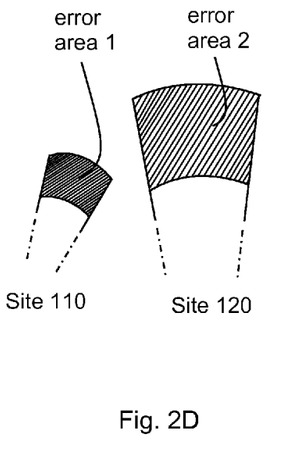
FIG. 2D is a schematic block diagram illustrating two non-overlapping two-dimensional estimation error areas in the spatial domain.

FIG. 2C illustrates the second case comprising two partially overlapping two-dimensional estimation error areas in the spatial domain.

If the two error areas overlap partially, there is a better direction of arrival estimation for both sites 110, 120 as the region of uncertainty is reduced.

FIG. 2D illustrates the third case comprising two non-overlapping two-dimensional estimation error areas in the spatial domain.

If the two error areas do not overlap at all, then perhaps the measurements are too noisy. At least one site 110, 120 may be too weak to be reliable in the communication system 100.

This explains why the coordinated sites 110, 120 may assist each other to improve direction of arrival accuracy and also can be equally applied to more than two sites 110, 120 in the CoMP system 100. With known CoMP geometric structure, the following relations exist. Each error area associated with a certain site 110, 120 depends on the position of the site 110, 120, direction of arrival, and the distance between the user equipment 130 and the site 110, 120. Mutual relationship between error areas depends on the relative location of each site 110, 120 in the system 100, which can check whether these error areas overlap or not. Uncertainty area for each site 110, 120 can be reduced, which further brings an improved estimation accuracy.

Figure 3A:
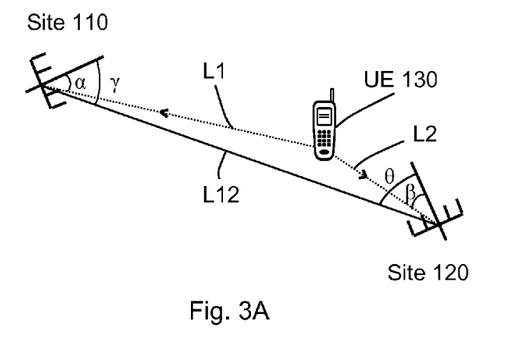
FIG. 3A is a schematic block diagram illustrating an exemplary embodiment of a communication system comprising two base stations.

FIG. 3A illustrates an exemplary embodiment of the CoMP communication system 100 comprising two base stations 110, 120.

In FIG. 3A, site 110 is a strong site, where the distance L1 between the user equipment 130 and site 110 can first be measured based on, e.g., uplink timing advance or path gain. Then, an additional direction of arrival estimate at the weak site 120 can be calculated by using the direction of arrival estimate at the strong site 110 along with the known geometric structure of the system 100. It is thus assumed that the geometric structure of the system 100, i.e., the distance L12 and the angles θ and γ are known. Also, a respective direction of arrival estimate α, β is assumed to be performed at each respective site 110, 120. Thus:

$$\alpha'' = \gamma - \arctan\frac{\sin(\theta - \beta) \cdot L1}{L12 - \cos(\theta - \beta) \cdot L1} \quad (1)$$

Finally, the direction of arrival estimate α', estimated at site 110 and the above calculated α" can be combined, e.g., in a weighted way as:

$$\alpha = a \cdot \alpha' + b \cdot \alpha'' \quad (2)$$

where a+b=1, according to some embodiments, wherein a is a first weight coefficient for the first site 110 and b is a second weight coefficient for the second site 120. The first and second weight coefficients a, b may be determined by using uplink channel information, such as timing advance, path loss or received signal-to-noise ratio, or any similar convenient measurement. It is to be noticed that besides the direction of arrival value of α', also the distance L1 between the base station 110 and the user equipment 130 is to be estimated.

Figure 3B:
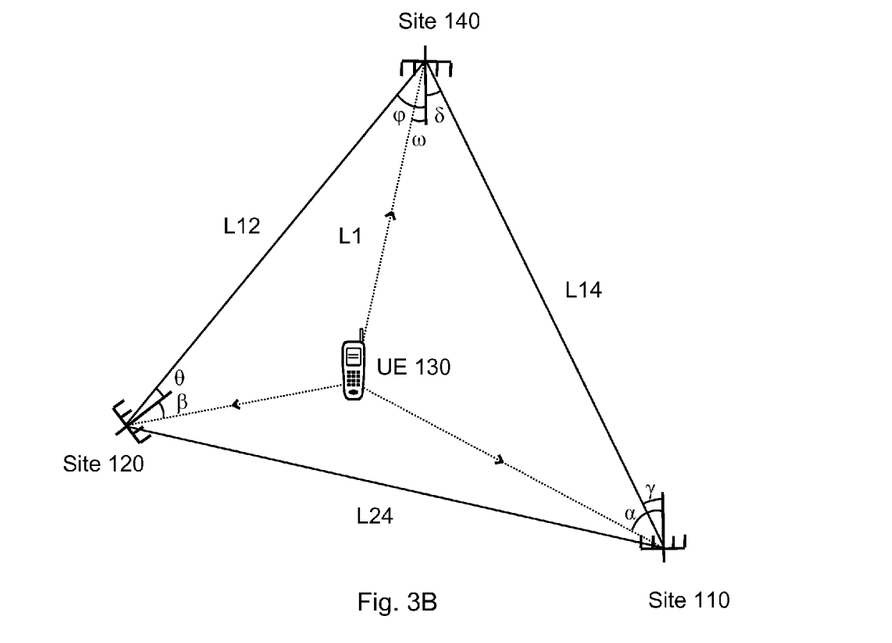
FIG. 3B is a schematic block diagram illustrating an exemplary embodiment of a communication system comprising three base stations.

FIG. 3B illustrates an exemplary embodiment of a communication system 100 comprising three base stations 110, 120, 140. Sites 120 and 140 are strong sites and site 110 is a weak site. Similar to the calculation illustrated above in connection with FIG. 3A, an additional direction of arrival estimate at the weak site 110 can be calculated using the direction of arrival estimates for the strong sites 120 and 140 as follows:

$$\alpha'' = \gamma + \arctan\frac{\sin(\delta + \omega) \cdot L1}{L13 - \cos(\delta + \omega) \cdot L1} \quad (3)$$

where L1 can be calculated based on sites 120 and 140 as:

$$L1 = L12 \cdot \frac{\sin(\theta + \beta)}{\sin(\varphi + \theta + \beta - \omega)} \quad (4)$$

Thus, unlike the example given in association with the illustrated embodiment in FIG. 3A, the distance L1 does not need to be separately estimated. Substituting equation (4) into (3), it is to be noticed that the direction of arrival estimate α" only depends on the geometric structure of the system 100, i.e., {φ, δ, θ, L12, L14} and the known direction of arrival estimates in the sites 120 and 140, i.e., {β, ω}. Therefore, it may be concluded that with more available sites 110, 120, 140 in a cooperating set, the direction of arrival estimate in each site 110, 120, 140 can be improved by using other direction of arrival estimates and the known geometric structure of the CoMP system 100. In this case, distance measurement may not be needed. Finally, the estimates α' and α" can be combined in a weighted way as $$\alpha = a \cdot \alpha' + b \cdot \alpha'' \quad (5)$$

where a is the weight coefficient for site 110 and b is the weight coefficient for site 140. a+b=1. Direction of arrival estimates can also be improved in an iterative way, where the direction of arrival estimate for a site 110, 120, 140 can be improved by using the direction of arrival estimates for the other sites 110, 120, 140 according to equations (3-5) which in turn can be used to improve the estimates for the other sites 110, 120, 140, according to some embodiments.

Figure 4:
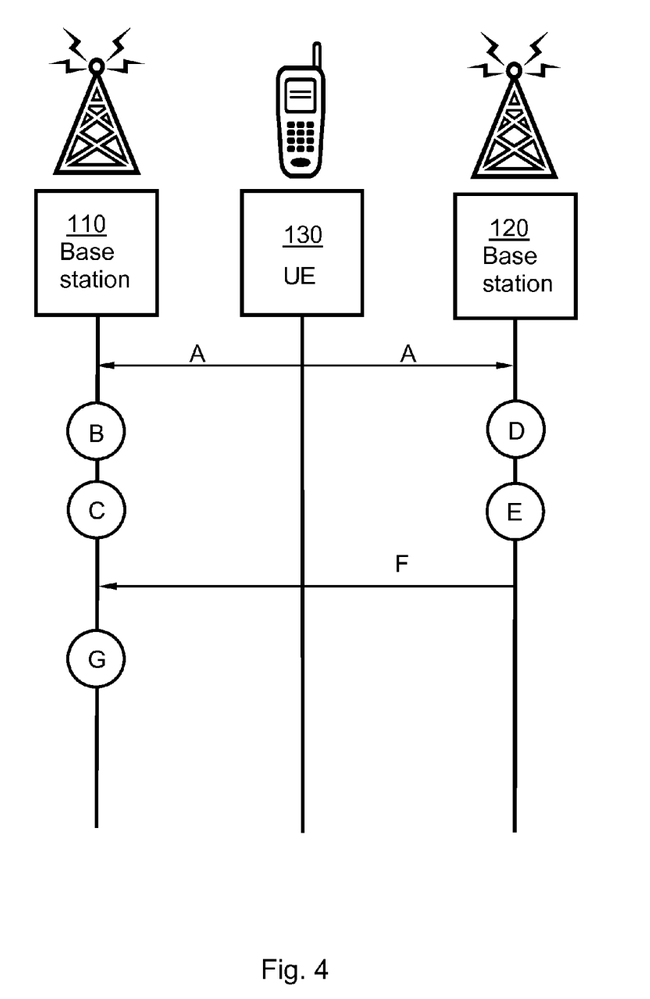
FIG. 4 is a combined block diagram and signaling scheme, illustrating some method steps and signaling comprised in some embodiments of the present method.

FIG. 4 illustrates some method steps and signaling denoted from A to G, comprised in some embodiments of the present method. A possible embodiment of the present method will now be described in a number of method steps A-F. It is to be noted that the method steps A-G may be performed in another sequential order than the enumeration indicates. Also, some of the method steps according to the described embodiments are optional and only comprised within some embodiments.

Step A

The user equipment 130 sends a signal. The signal may be broadcasted and/or multicasted to a plurality of base stations 110, 120 according to some embodiments. The signal may comprise information such as, e.g., an uplink Sounding Reference Signal (SRS), uplink timing advance, path loss and/or signal strength, just to mention some examples.

Step B

The user equipment signal is received at the first base station 110. A measurement may be performed based on the signal received from the user equipment 130. Thus a first weight coefficient a, associated with the first base station 110, may be determined. The weight coefficient a will be different depending on the any of the following rules: received signal to noise ratio of uplink sounding reference signals, uplink timing advance and/or estimation of path loss.

The first base station 110 may thereby be categorized as a strong or weak site, respectively. A strong site corresponds to the one which has higher received signal-to-noise ratio or shorter uplink timing advance or lower path loss; otherwise, it is a weak site. In addition, a strong site means a smaller error area while on the other hand; a weak site means a larger error area. An optional path loss threshold value may be predetermined, forming the limit between categorization between strong site and weak site, according to different embodiments.

Step C

A first parameter value α' is estimated, based on the measured signal, received from the user equipment 130. The first parameter value α' may be, e.g., a direction of arrival value, and may be estimated by any arbitrary method based on, e.g., Angle of Arrival (AoA), Time Difference of Arrival (TDOA), Frequency Difference of Arrival (FDOA), or other similar associated techniques.

Step D

The user equipment signal is received at the second base station 120. A measurement may be performed based on the signal received from the user equipment 130. Thus a second weight coefficient b, associated with the second base station 120, may be determined. The second weight coefficient b will be different depending on the any of the following rules: received signal to noise ratio of uplink sounding reference signals, uplink timing advance and/or estimation of path loss.

The second base station 120 may thereby be categorized as a strong or weak site, respectively. A strong site corresponds to the one which has higher received signal to noise ratio or shorter uplink timing advance or lower path loss; otherwise, it is a weak site. In addition, a strong site means a smaller error area while on the other hand; a weak site means a larger error area. An optional path loss threshold value may be predetermined, forming the limit between categorization between strong site and weak site, according to different embodiments.

Step E

A parameter value $\beta$ is estimated, based on the measured signal, received from the user equipment 130. The parameter value $\beta$ may be, e.g., a direction of arrival value, and may be estimated by any arbitrary method based on, e.g., Angle of Arrival (AoA), Time Difference of Arrival (TDOA), Frequency Difference of Arrival (FDOA), or other similar associated techniques.

Step F

According to some embodiments, the estimated parameter value $\beta$ is sent to the first base station 110, according to some embodiments. The first base station 110 thus receives the estimated parameter value $\beta$ from the second base station 120 and uses it as a base for calculating a second parameter value $\alpha''$.

However, according to other embodiments, the second parameter value $\alpha''$ is computed at the second base station 120, based on the estimated parameter value $\beta$. The second parameter value $\alpha''$ is then provided to the first base station 110, according to those embodiments.

Step G

The first location parameter $\alpha$ is calculated, based on the first estimated parameter value $\alpha'$ and the obtained second parameter value $\alpha''$.

According to some embodiments, the first weight coefficient a and the second weight coefficient b, previously determined in Step B and Step D, respectively, may be used for performing the first location parameter $\alpha$ calculation. The weight coefficients a and b may be calculated such that a+b=1, according to some embodiments. Thus:

$$\alpha = a \cdot \alpha' + b \cdot \alpha''$$

Figure 5:
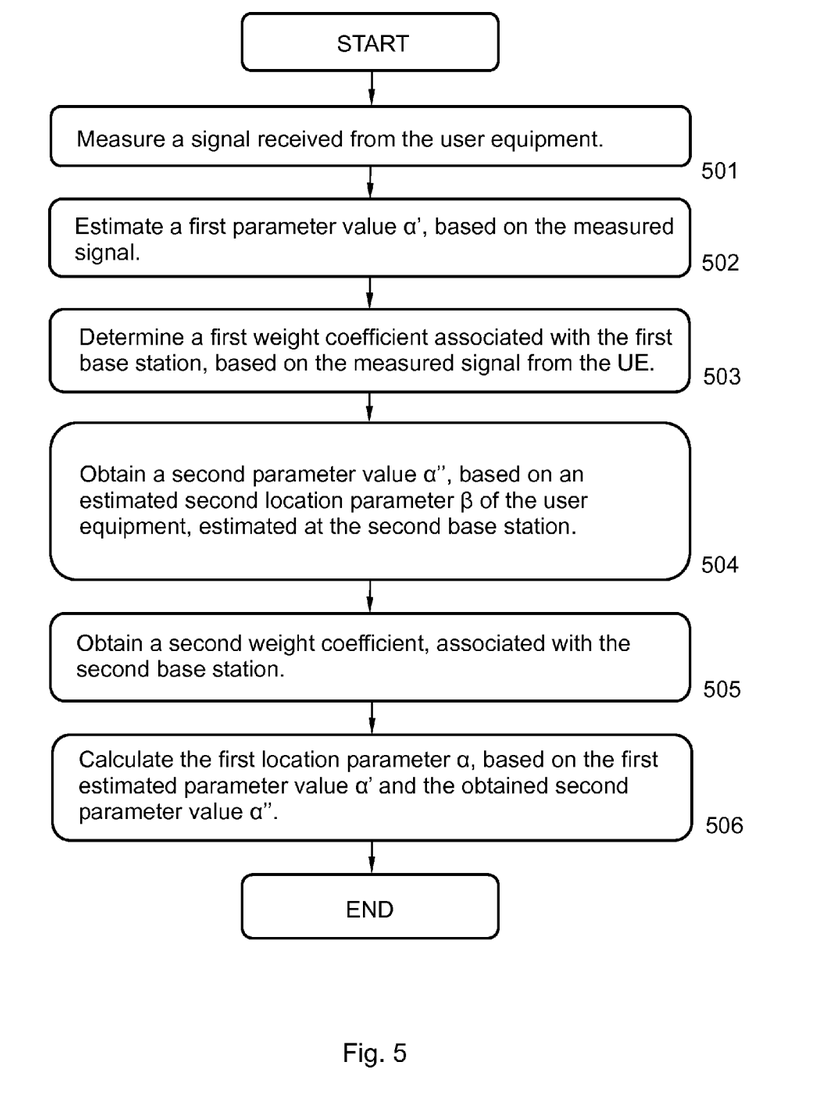
FIG. 5 is a flow chart illustrating embodiments of the present method in a base station.

FIG. 5 is a flow chart illustrating embodiments of method steps 501-506 performed in a first base station 110. The method steps 501-506 aims at calculating a first location parameter $\alpha$ of a user equipment 130. The first base station 110 and the user equipment 130 are comprised in a communication system 100 together with a second base station 120. The communication system 100, may be, e.g., a LTE radio network and the first and second base stations 110, 120 may be, e.g., an evolved node B, eNB, according to some embodiments. The communication system 100 is a Coordinated Multiple Point (COMP) system and the method is used to improve beamforming accuracy.

The first location parameter $\alpha$ of the user equipment 130 may be any of: a direction of arrival of a signal received from the user equipment 130 or a distance between the first base station 110 and the user equipment 130, according to some embodiments.

To appropriately calculate the first location parameter $\alpha$ of the user equipment 130, the method may comprise a number of method steps 501-506.

It is however to be noted that some of the described method steps are optional and only comprised within some embodiments. Further, it is to be noted that the method steps 501-506 may be performed in a somewhat different chronological order and that some of them, e.g., step 502 and step 503, may be performed simultaneously or in a rearranged chronological order. The method may comprise the following steps:

Step 501

A measurement is performed on a signal received from the user equipment 130. The measurement may be performed according to any of the following rules: received signal to noise ratio of uplink sounding reference signals, uplink timing advance and/or estimation of path loss.

Step 502

A first parameter value $\alpha'$ is estimated, based on the measured signal.

Step 503

This step is optional and may only be performed within some embodiments.

A first weight coefficient a, associated with the first base station 110 may be determined, based on the measured signal from the user equipment 130, according to some embodiments.

The first weight coefficient a may be determined based on the measured signal, received from the user equipment 130 according to any of the following rules: received signal to noise ratio of uplink sounding reference signals, uplink timing advance, estimation of path loss.

Step 504

A second parameter value $\alpha''$ is obtained. The second parameter value $\alpha''$ is based on an estimated second location parameter $\beta$ of the user equipment 130, estimated at the second base station 120.

According to some embodiments, the second parameter value $\alpha''$ is received from the second base station 120. Thus according to these embodiments, the second parameter value $\alpha''$ may be calculated in the second base station 120 and the result may be transmitted to the first base station 110.

However, according to some embodiments, the step of obtaining the second parameter value $\alpha''$ comprises receiving, from the second base station 120, the estimated second location parameter $\beta$, estimated at the second base station 120, and calculating the second parameter value $\alpha''$ based on the received estimated second location parameter $\beta$ and known geometric relation between the first and second base stations 110, 120. Thus the second parameter value $\alpha''$ may as well, according to some embodiments, be calculated within the first base station 110, based on measurements performed at the second base station 130, transmitted to the first base station 110.

Step 505

This step is optional and may only be performed within some embodiments.

A second weight coefficient b, associated with the second base station 120 may be obtained, according to some embodiments.

Step 506

The first location parameter $\alpha$ is calculated. The calculation of the first location parameter $\alpha$ is based on the first estimated parameter value $\alpha'$ and the obtained second parameter value $\alpha''$.

According to some embodiments, the user equipment location parameter $\alpha$, comprises multiplying the first weight coefficient a with the first estimated parameter value $\alpha'$, multiplying the second weight coefficient b with the obtained second parameter value $\alpha''$ and adding the two sums, such that:

$$\alpha = a \cdot \alpha' + b \cdot \alpha''.$$

Figure 6:
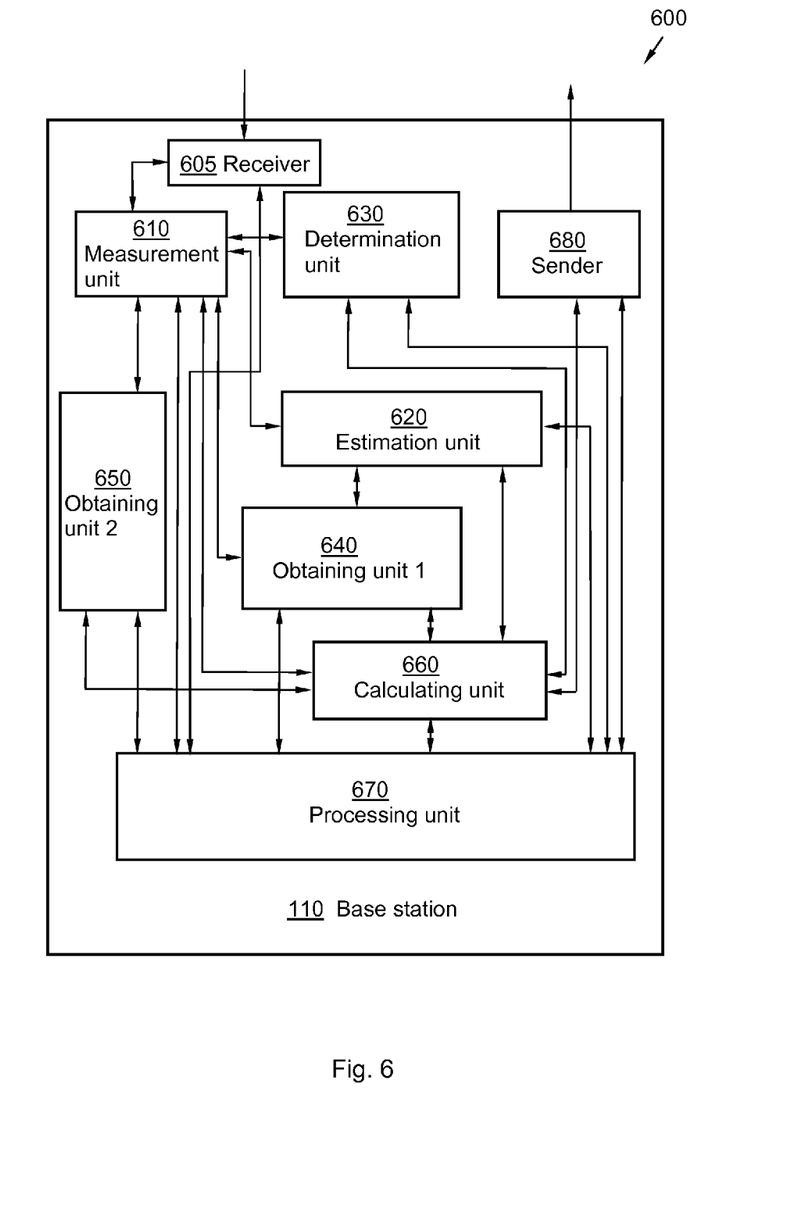
FIG. 6 is a schematic block diagram illustrating embodiments of a base station arrangement.

FIG. 6 schematically illustrates an arrangement 600 in a first base station 110. The arrangement 600 is adapted to perform any, some or all of the method steps 501-506 in order to calculate a first location parameter $\alpha$ of a user equipment 130.

The first base station 110 and the user equipment 130 are comprised in a communication system 100 together with a second base station 120. The communication system 100, may be, e.g., a LTE radio network and the first and second base stations 110, 120 may be, e.g., an evolved node B, eNB, according to some embodiments. The communication system 100 is a Coordinated Multiple Point (COMP) system and the method is used to improve beamforming accuracy.

The first location parameter α of the user equipment 130 may be any of: a direction of arrival of a signal received from the user equipment 130 or a distance between the first base station 110 and the user equipment 130, according to some embodiments.

In order to perform the method steps 501-506 correctly, the base station arrangement 600 comprises a plurality of units such as, e.g., a measurement unit 610. The measurement unit 610 is configured to perform measurements on a signal received from the user equipment 130. Further, the base station arrangement 600 comprises an estimating unit 620. The estimating unit 620 is configured to estimate a first parameter value α', based on the measured signal. Also, the base station arrangement 600 comprises, in addition, an obtaining unit 640. The obtaining unit 640 is configured to obtain a second parameter value α", based on an estimated second location parameter β of the user equipment 130, estimated at the second base station 120. Additionally, the base station arrangement 600 also comprises a calculating unit 660. The calculating unit 660 is configured to calculate the first location parameter α, based on the first estimated parameter value α' and the obtained second parameter value α". Accordingly, the measurement unit 610, estimation unit 620, determination unit 630, obtaining unit 640 and calculating unit 660 comprises a receive signal processor.

Further, according to some embodiments, the base station arrangement 600 may comprise a receiver 605. The receiver 605 is configured to receive a signal from the user equipment 130, according to some embodiments.

In further addition, the arrangement 600 may comprise a determination unit 630. The determination unit 630 is configured to determine the first weight coefficient a, associated with the first base station 110, based on the measured signal from the user equipment 130.

According to some embodiments, the base station arrangement 600 may comprise an optional second obtaining unit 650. The second obtaining unit 650 is configured to obtain a second weight coefficient b, associated with the second base station 120.

Optionally, the arrangement 600 further also may comprise a processing unit 670. The processing unit 670 may be represented by, e.g., a Central Processing Unit (CPU), a processor, a microprocessor, or other processing logic that may interpret and execute instructions. The processing unit 670 may perform all data processing functions for inputting, outputting, and processing of data including data buffering and device control functions, such as call processing control, user interface control, or the like.

In further addition, the arrangement 600 may comprise a sender 680. The sender 680 is configured to send signals wirelessly, according to some embodiments.

It is to be noted that any internal electronics of the base station 110 and/or the base station arrangement 600, not completely necessary for understanding the present method according to the method steps 501-506 has been omitted from FIG. 6, for clarity reasons.

Further, it is to be noted that some of the described units 605-680 comprised within the arrangement 600 in the base station 110 are to be regarded as separate logical entities but not with necessity separate physical entities. To mention just one example, the receiving unit 605 and the sending unit 680 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first base station 110 and the user equipment 130 may comprise both traffic and control signals, e.g., paging signals/messages for incoming calls, which may be used to establish and maintain a voice call communication with another party or to transmit and/or receive data, such as SMS, e-mail or MMS messages, with a remote user equipment.

The method steps 501-506 in the first base station 110 may be implemented through one or more processor units 670 in the first base station 110, together with computer program code for performing the functions of the present method steps 501-506. Thus a computer program product, comprising instructions for performing the method steps 501-506 in the first base station 110 may calculate the first location parameter a of the user equipment 130 adjust the channel quality indicator value, when the computer program product is loaded into the processor unit 670.

The computer program product mentioned above may be provided for instance in the form of a tangible data carrier carrying computer program code for performing the method steps according to the present solution when being loaded into the processor unit 670. The tangible data carrier may be, e.g., a hard disk, a CD ROM disc, a memory stick, an optical storage device, a magnetic storage device or any other appropriate physical and tangible medium such as a disk or tape that can hold and store machine readable data. The computer program code can furthermore be provided as program code on a server and downloaded to the first base station 110 remotely, e.g., over an Internet or an intranet connection.

Further, a computer program product comprising instructions for performing at least some of the method steps 501-506 may be used for implementing the previously described method in the first base station 110 for calculating the first location parameter α of the user equipment 130, when the computer program product is run on the processing unit 670 comprised within the first base station 110.

It may further be mentioned that by means of example and in order to simplify the comprehension, the term SNR has been consistently used in this text when describing a Signal to noise and Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like, e.g., the Signal to Noise Ratio (S/N), Signal to Noise and Interference Ratio (SNIR), Signal to noise and Interference Ratio (SIR), Signal to Interference and Noise Ratio (SINR) or an inversion of the ratio, like Interference to Signal Ratio, (ISR). Any of these or similar ratios may be used in the context of this description instead of the SNR.

When using the formulation "comprise" or "comprising" it is to be interpreted as non-limiting, i.e., meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

What is claimed is:

1. A method in a first base station for calculating a first location parameter (α) of a user equipment in order to improve beamforming accuracy within a Coordinated Multiple Point (CoMP) communication system, which communication system comprises the first base station, the user equipment and a second base station, the method comprising:
  measuring a signal received from the user equipment;
  determining a first estimate ($\alpha'$) of the first location parameter, based on the measured signal;
  obtaining a second estimate ($\alpha''$) of the first location parameter, based on a second location parameter of the user equipment, estimated at the second base station, said second location parameter is different from said second estimate of the first location parameter;
  calculating the first location parameter based on the first estimate of the first location parameter and the obtained second estimate of the first location parameter.

2. The method of claim 1 further comprising:
  determining a first weight coefficient (a), associated with the first base station, based on the measured first signal from the user equipment;
  obtaining a second weight coefficient (b), associated with the second base station; and
  wherein the calculating the first location parameter comprises:
    multiplying the first weight coefficient with the first estimate of the first location parameter;
    multiplying the second weight coefficient with the second estimate of the first location parameter;
    adding the two multiplication results such that:

$$\alpha = a \cdot \alpha' + b \cdot \alpha''.$$

3. The method of claim 2 wherein the determining the first weight coefficient is performed based on at least one of the following parameters of the measured first signal:
  received signal to noise ratio of uplink sounding reference signals;
  uplink timing advance;
  estimation of path loss.

4. The method of claim 3 wherein:
  a sum of the first weight coefficient and the second weight coefficient is 1;
  the relation between the first and second weight coefficients is such that at least one of a higher received signal to noise ratio, shorter uplink timing advance, and lower path loss renders a higher coefficient value and a lower received signal to noise ratio, longer uplink timing advance, or higher path loss render a lower coefficient value.

5. The method of claim 2 wherein the first location parameter is any of:
  a direction of arrival of a signal received from the user equipment;
  a distance between the first base station and the user equipment.

6. The method of claim 2 wherein the obtaining a second estimate of the first location parameter comprises receiving the second estimate of the first location parameter value from the second base station.

7. The method according to claim 2 wherein the obtaining a second estimate of the first location parameter comprises:
  receiving, from the second base station, the second location parameter estimated at the second base station;
  calculating the second estimate of the first location parameter based on the received estimated second location parameter and known geometric relation between the first and second base stations.

8. The method of claim 1 wherein the first location parameter is any of:
  a direction of arrival of a signal received from the user equipment;
  a distance between the first base station and the user equipment.

9. The method of claim 1 wherein obtaining the second estimate of the first location parameter comprises receiving the second estimate of the first location parameter from the second base station.

10. The method according to claim 1 wherein obtaining the second estimate of the first location parameter comprises:
  receiving, from the second base station, the second location parameter estimated at the second base station;
  calculating the second estimate of the first location parameter value based on the received estimated second location parameter and known geometric relation between the first and second base stations.

11. A base station adapted to calculate a first location parameter ($\alpha$) of a user equipment in order to improve beamforming accuracy within a Coordinated Multiple Point (CoMP) communication system, the base station comprising:
  a transmitter;
  a receiver;
  a received signal processor for processing signals received by the receiver, the received signal processor comprising:
    a measurement unit configured to perform measurements on a signal received from the user equipment;
    an estimating unit configured to estimate a first estimate ($\alpha'$) of the first location parameter based on the measured signal;
    a first obtaining unit configured to obtain a second estimate ($\alpha''$) of the first location parameter based on a second location parameter of the user equipment estimated at the second base station, said second location parameter is different from said second estimate of the first location parameter;
    a calculating unit configured to calculate the first location parameter based on the first estimate of the first location parameter and the obtained second estimate of the first location parameter.

12. The base station of claim 11 wherein the first obtaining unit is configured to obtain the second estimate of the first location parameter by:
  receiving, from the second base station, the estimated second location parameter estimated at the second base station;
  calculating the second estimate of the first location parameter based on the received estimated second location parameter and known geometric relation between the first and second base stations.

13. The base station of claim 11 wherein the first location parameter is any of:
  a direction of arrival of a signal received from the user equipment;
  a distance between the first base station and the user equipment.

14. The base station of claim 11 wherein the received signal processor further comprises:
  a determination unit configured to determine a first weight coefficient (a), associated with the first base station, based on the measured signal from the user equipment;
  a second obtaining unit configured to obtain a second weight coefficient (b), associated with the second base station;

wherein the calculating unit is configured to calculate the first location parameter by:
multiplying the first weight coefficient with the first estimate of the first location parameter;
multiplying the second weight coefficient with the obtained second estimate of the first location parameter value;
adding the two multiplication results such that:

$\alpha = a \cdot \alpha' + b \cdot \alpha''$.

15. The base station of claim 14 wherein the determination unit determines the first weight coefficient based on at least one of the following parameters of the measured signal:
received signal to noise ratio of uplink sounding reference signals;
uplink timing advance;
estimation of path loss.

16. The base station of claim 15 wherein:
a sum of the first weight coefficient and the second weight coefficient is 1;
the relation between the first and second weight coefficients is such that at least one of a higher received signal to noise ratio, shorter uplink timing advance, and lower path loss renders a higher coefficient value and a lower received signal to noise ratio, longer uplink timing advance, or higher path loss renders a lower coefficient value.

* * * * *